United States Patent
Casset (10) Patent No.: US 11,852,906 B2
(45) Date of Patent: Dec. 26, 2023

(54) OPTICAL DEVICE AND MANUFACTURING PROCESS

(71) Applicant: COMMISSARIAT A L'ENERGIE ATOMIQUE ET AUX ENERGIES ALTERNATIVES, Paris (FR)

(72) Inventor: Fabrice Casset, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 299 days.

(21) Appl. No.: 17/353,183

(22) Filed: Jun. 21, 2021

(65) Prior Publication Data
US 2021/0397027 A1   Dec. 23, 2021

(30) Foreign Application Priority Data

Jun. 19, 2020 (FR) ..................... 20 06465

(51) Int. Cl.
| | | |
|---|---|---|
| *G02F 1/01* | (2006.01) | |
| *G01S 7/481* | (2006.01) | |
| *G01S 17/89* | (2020.01) | |

(52) U.S. Cl.
CPC ............ *G02F 1/011* (2013.01); *G01S 7/4818* (2013.01); *G01S 17/89* (2013.01); *G02F 1/0134* (2013.01); *G02F 2203/05* (2013.01)

(58) Field of Classification Search
CPC .... G02F 1/011; G02F 1/0134; G02F 2203/50; G01S 7/4818; G01S 17/89
See application file for complete search history.

(56) References Cited

U.S. PATENT DOCUMENTS

| | | | |
|---|---|---|---|
| 5,383,048 A | 1/1995 | Seaver | |
| 10,241,352 B2 * | 3/2019 | Epping | ............ G02B 6/29353 |
| 10,670,942 B2 * | 6/2020 | Casset | ................... G02F 1/0134 |
| 11,569,431 B1 * | 1/2023 | Eichenfield | ............ G02F 1/125 |

(Continued)

FOREIGN PATENT DOCUMENTS

| | | | | |
|---|---|---|---|---|
| EP | 3 514 614 A1 | 7/2019 | | |
| JP | 07028006 A | * 1/1995 | ............... G02F 1/03 |

(Continued)

OTHER PUBLICATIONS

French Preliminary Search report dated Feb. 25, 2021 in French Application 20 06465, filed on Jun. 19, 2020 (with English translation of Categories of Cited Documents & Written Opinion), 11 pages.

(Continued)

*Primary Examiner* — Daniel Petkovsek
(74) *Attorney, Agent, or Firm* — Oblon, McClelland, Maier & Neustadt, L.L.P.

(57) ABSTRACT

A phase modulator for a light beam comprising a waveguide having a longitudinal axis, and a piezoelectric actuator to apply a mechanical stress within said waveguide in response to an electrical bias, said actuator comprising a first part covering a first side of the waveguide and having a first axis of symmetry essentially parallel to the longitudinal axis. The actuator comprises a second part covering a second side of the waveguide, said second part having a second axis of symmetry essentially parallel to the longitudinal axis.

18 Claims, 6 Drawing Sheets

(56) References Cited

U.S. PATENT DOCUMENTS

2004/0096155 A1    5/2004   Singh et al.
2019/0219887 A1    7/2019   Casset et al.

FOREIGN PATENT DOCUMENTS

JP            08015354 A   *   1/1996   ............ G01R 29/08
WO    WO 2007/065447 A1    6/2007

OTHER PUBLICATIONS

Casset et al. "Stress optic modulator using thin-film PZT for LIDAR applications", 2019 IEEE SENSORS, IEEE, 2019, 4 pages.
Hosseini et al. "Stress-optic modulator in TriPleX platform using a piezoelectric lead zirconate titanate (PZT) thin film", Optics Express, vol. 23, No. 11, 2015, 9 pages.
Van Acoleyen et al. "Two-Dimensional Dispersive Off-Chip Beam Scanner Fabricated on Silicon-on-Insulator", IEEE Photonics Technology Letters, vol. 23, No. 17, 2011, 3 pages.
Abiri, et al. "Electronic Two-Dimensional Beam Steering for Integrated Optical Phased Arrays", Optical Society of America 2014, 3 pages.

* cited by examiner

FIG. 1

Conventional Art

FIG. 2

Conventional Art

OPTICAL DEVICE AND MANUFACTURING PROCESS

TECHNICAL FIELD

The present invention concerns the field of photonics and optoelectronics. It finds at least one particularly advantageous application in the field of phase modulators of optical beams. It will find an advantageous but non-limiting application in the manufacture of optical phase shifters comprising a piezoelectric actuator.

STATE OF THE ART

In the field of photonics, many technologies require a phase modulation of a light beam in order to exploit an optical signal. This is the case with telecommunications systems, for example. This is also the case with imaging and remote sensing systems such as LIDAR (Light Detection And Ranging systems).

Figure 1:
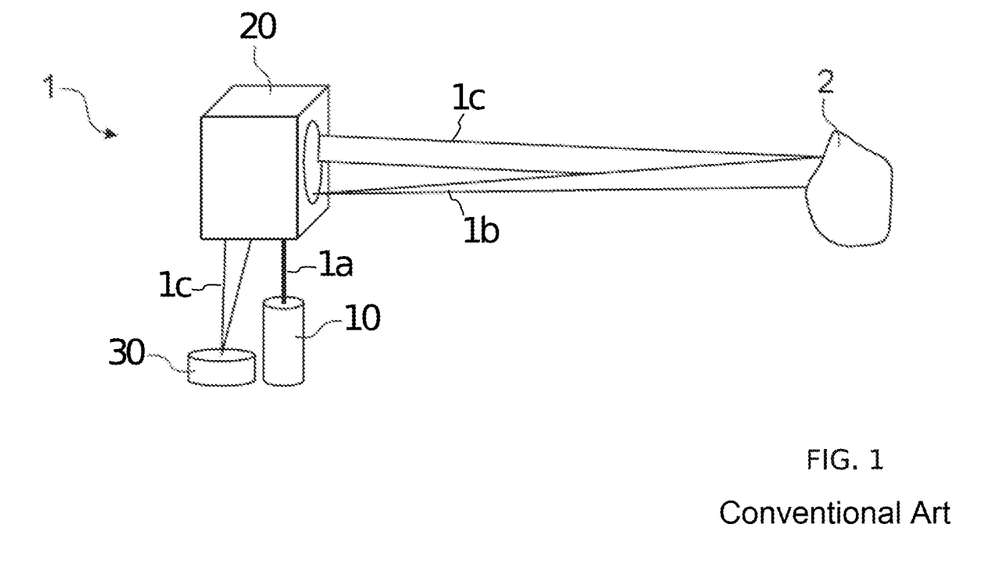
FIG. 1 illustrates a remote sensing system of the LIDAR type, according to the prior art.

As illustrated in FIG. 1, in a LIDAR type system 1, a light beam 1a typically from a laser source 10 is deflected by a scanning device 20 in order to scan an area to be imaged. When the incident beam 1b from the scanning device 20 is reflected by an obstacle 2, the reflected beam 1c is collected then analyzed by a detector 30. The measurement of the delay between the emission of the incident beam 1b and the detection of the reflected beam 1c allows in particular determining the distance between the remote sensing system 1 and the obstacle 2.

Figure 2:
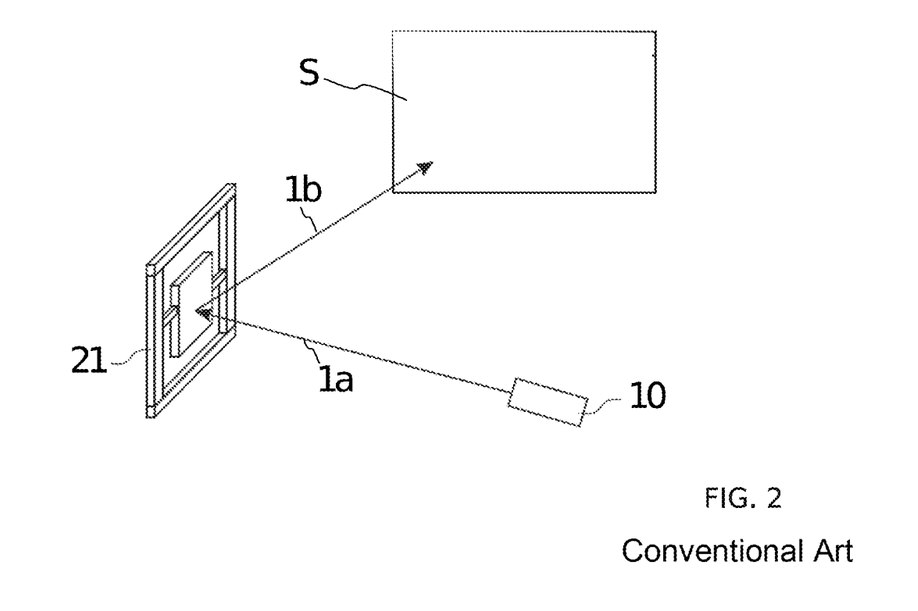
FIG. 2 illustrates a scanning device of a LIDAR, according to the prior art.

In practice, different scanning devices 20 can be considered. A micro-mirror 21 of MEMS (Micro Electro Mechanical System) type can for example allow directing the light beam 1a, 1b towards the area to be imaged S, as illustrated in FIG. 2. The production of such a micro-mirror 21 remains, nevertheless, costly. Its integration within the scanning device 20 is further complex.

Figure 3:
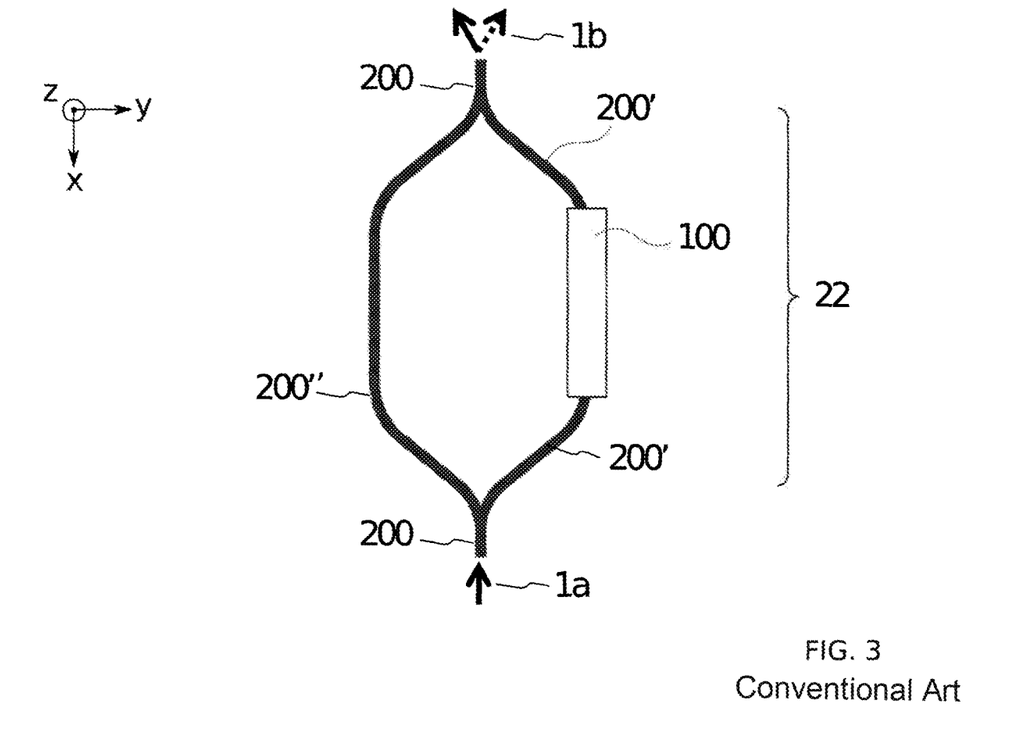
FIG. 3 illustrates an optical phase shifter of a scanning device, according to the prior art.

Another solution illustrated in FIG. 3 is to use a main waveguide 200 associated with an optical phase shifter 22 in Mach-Zehnder configuration. The main waveguide 200 is divided into two secondary waveguides 200', 200" or arms each guiding a part of the light beam 1a. One of the parts of the light beam is phase shifted by a phase modulator 100 associated with one of the arms 200' of the phase shifter 22, called phase shifting arm. After phase shifting, the recombination of the two parts of the light beam allows modifying the direction of propagation of the light beam 1b at the output of the main waveguide 200. By modulating the phase of the part of the light beam propagating in the phase shifting arm of the phase shifter 22, it is thus possible to induce a scanning of the light beam 1b at the output of the main waveguide 200. Other configurations of optical phase shifters are also possible, for example of the OPA (optical phased array) type. These phase shifters generally comprise at least one waveguide and one phase modulator associated with the waveguide.

The waveguides can typically be made on a silicon chip, via the microelectronic technologies. The principle of phase modulation is typically based on a modulation of the refractive index within the waveguide. Different technical solutions can be implemented to generate this index modulation.

According to one solution, the index modulation can be generated by a thermo-optical effect. In this case, the phase modulator comprises an integrated heating resistor in the vicinity of the waveguide. When a current is passed through this resistor, a temperature rise by the Joule effect induces an index variation. The document "K. Van Acoleyen, W. Bogaerts, J. Jágerská, N. L. Thomas, R. Houdré, and R. Baets, Off-chip beam steering with a one-dimensional optical phased array on silicon-on-insulator, Opt. Lett., Vol. 34, no. 9, pp. 1477-1479 (2009)" discloses a scanning device based on such index modulation by thermo-optic effect. However, this solution induces a high power consumption.

According to another solution, the index modulation can be generated by a space charge region within the waveguide. In this case, the phase modulator typically comprises a PIN diode integrated into the waveguide. By biasing the PIN diode, the concentration of carriers varies within the waveguide and changes the refraction index accordingly. The document "Behrooz Abiri, Firooz Aflatouni, Angad Rekhi and Ali Hajimiri, Electronic Two-Dimensional Beam Steering for Integrated Optical Phased Arrays, M2K.7. OSA (2014)" discloses a scanning device based on such a carrier depletion index modulation. However, making PIN diodes for the index modulation requires a significant number of technological steps. This increases the cost of the scanning device.

According to another solution, the index modulation can be generated by a piezoelectric effect. In this case, the phase modulator comprises a piezoelectric actuator placed in the vicinity of the waveguide. By biasing the actuator, a mechanical stress is generated within the waveguide. This mechanical stress then changes the refractive index. The document "Hosseini, Stress-optic modulator in TriPlex platform using a piezoelectric lead zirconate titanate (PZT) thin film, Optics express 14018 (2015)" discloses an optical phase shifter comprising such a modulator. The document US 2004/096155 A1 discloses another optical device comprising a piezoelectric phase modulator. Another optical device comprising a piezoelectric phase modulator offset relative to the waveguide is disclosed by the document US 2019/219887 A1. However, the amplitude of the index variations obtained by these solutions remains limited.

An object of the present invention is to at least partially overcome the drawbacks of the solutions mentioned above.

In particular, an object of the present invention is to propose a phase modulator allowing increasing the amplitude of the refractive index variations in a waveguide.

The other objects, features and advantages of the present invention will appear on examining the following description and the accompanying drawings. It is understood that other benefits can be incorporated. In particular, some features and some advantages of the phase modulator may be applied mutatis mutandis to the method, and vice versa.

SUMMARY

In order to achieve the objectives mentioned above, a first aspect of the invention concerns a phase modulator for a light beam comprising:
- a waveguide having a longitudinal axis directed in a first direction, the waveguide being intended to guide a light beam mainly along the longitudinal axis, and
- a piezoelectric actuator configured to apply at least one mechanical stress within said waveguide in response to an electrical bias.

The phase modulator is configured such that the actuator covers at least two sides of the waveguide and such that the resultant of the stresses applied by the actuator on the waveguide, at the axis longitudinal, is not zero. Thus, the actuator has at least one asymmetry relative to the longitudinal axis of the waveguide. This allows increasing the state of stress within the waveguide.

Preferably, the actuator comprises a first part covering a first side of the waveguide. This first part preferably has a first axis of symmetry essentially parallel to the longitudinal axis and a main dimension L1 taken in a second direction of a plane transverse to the longitudinal axis. The first axis of symmetry is preferably offset from the longitudinal axis by an offset distance d1 taken in the second direction.

Advantageously, the actuator comprises at least one second part covering a second side of the waveguide. Preferably, said second part has a second axis of symmetry essentially parallel to the longitudinal axis and a main dimension L2 taken in a third direction of the plane transverse to the longitudinal axis.

The first part of the actuator allows applying a first mechanical stress to the waveguide. When the actuator is electrically biased, the deformation of the first part of the actuator is more significant at the edge than in the center thereof. It is therefore advantageous to shift the position of the waveguide under the actuator, in the vicinity of the edge of this first part, so that the waveguide is subjected to a more significant stress state.

In order to further increase the state of stress in the waveguide, it appeared in the context of the development of the present invention that a second actuator part could advantageously be adjoined on a second side of the waveguide. This second part of the actuator allows applying a second mechanical stress to the waveguide. The lever arm effect exerted on the waveguide can thus be amplified by this second actuator part. The state of stress in the waveguide resulting from the application of the first and second mechanical stresses is thus greatly increased.

The developments which have led to the present invention have shown that the increase in stress is effectively observed if the components of the stress tensors of the first and second constrains are not opposed within the waveguide. This situation is in particular reached when an asymmetry is introduced into the geometry of the actuator and/or in the positioning of the actuator relative to the waveguide. The asymmetry in the geometry of the actuator is typically made by adding a second actuator part on a second side of the waveguide. The asymmetry in the positioning of the actuator relative to the waveguide is typically made by offsetting the first and/or the second axis of symmetry from the first and/or second actuator part relative to the longitudinal axis of the waveguide.

Figure 4:
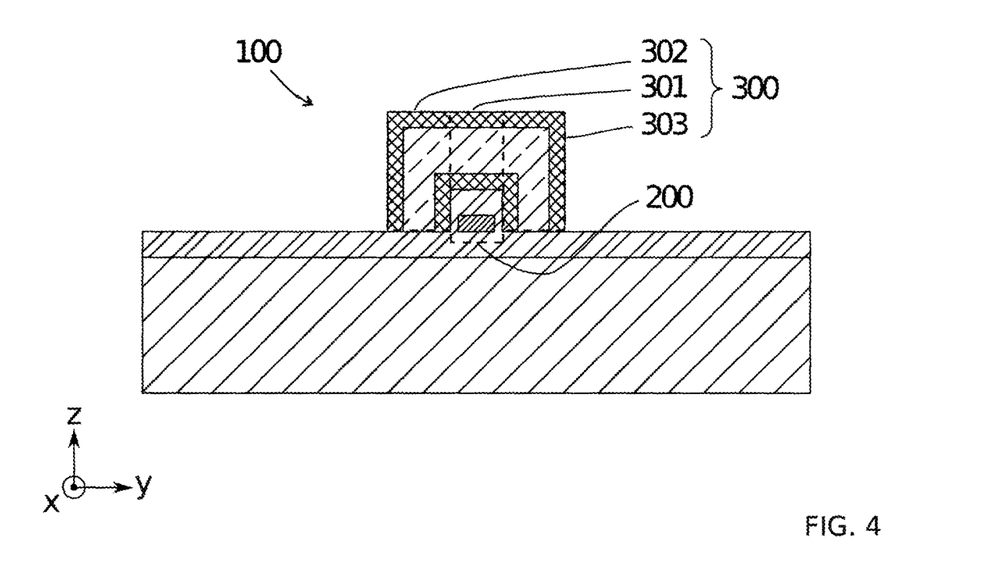
FIG. 4 illustrates a phase modulator solution which differs from the solution adopted in the context of the present invention.

In order to increase the state of stress within a waveguide, an actuator configuration as illustrated in FIG. 4 is an alternative solution which could have been considered. This alternative solution was not retained in the context of the present invention because it was identified that such an actuator 300 comprising three parts 301, 302, 303 which are regularly distributed around the waveguide 200 generated a state of constraint in the waveguide which is less significant than the cases considered by the invention. This unsuccessful solution does not benefit from the synergistic increase in the state of stress, induced in particular by the lever arm effect. The first, second and third stresses applied respectively by the three parts 301, 302, 303 may possibly partially compensate for each other, leading to a decrease in the state of stress within the waveguide. This solution, although possible, therefore proved in practice inoperative, and was not adopted.

On the contrary, the invention allows, by introducing first and second constraints acting synergistically and benefiting in particular from the lever arm effect, significantly increasing the state of stress within the waveguide compared to the known solutions. The phase modulator according to the invention thus allows significantly increasing the amplitude of the refractive index variations in a waveguide. Such a modulator can thus be advantageously used in an optical phase shifter scanning device. Other applications, for example in telecommunications, can be considered for such a modulator.

According to one possibility, the first axis of symmetry is a set of barycentres of the first actuator part, said barycentres being defined for sections of the first part, in planes which are transverse to the longitudinal axis.

According to one possibility, the second axis of symmetry is a set of barycentres of the second actuator part, said barycentres being defined for sections of the second part, in planes which are transverse to the longitudinal axis.

A second aspect of the invention concerns a method for manufacturing such a phase modulator. This method comprises in particular the following steps of:

Forming a layer of a cladding material with a thickness $e'_{cladding}$ on a silicon substrate, Forming a waveguide pattern of a core material, said pattern having a longitudinal axis directed in a first direction, Coating the pattern by a coating based on the cladding material, Structuring the coating so as to form a first side and a second side of the waveguide, Depositing first and second piezoelectric stacks respectively on the first and second sides of the waveguide, so as to form first and second actuator parts.

Structuring the first stack such that the first actuator part has a first axis of symmetry essentially parallel to the longitudinal axis and offset from the longitudinal axis by an offset distance d1 taken in a second direction of a plane transverse to the longitudinal axis.

Another aspect of the invention concerns an optical system comprising at least one phase modulator according to the first aspect. This system can be, for example and without limitation, a telecommunications system, an imaging and remote sensing system such as a LIDAR, an optical phased array, an optical switch.

BRIEF DESCRIPTION OF THE FIGURES

The aims, objects, as well as the features and advantages of the invention will become more apparent from the detailed description of embodiments of the latter which are illustrated by the following accompanying drawings in which.

The drawings are given by way of examples and are not limiting of the invention. They constitute schematic representations of principle intended to facilitate the understanding of the invention and are not necessarily at the scale of the practical applications. In particular, the dimensions of the different elements of the phase modulator (core and cladding of the waveguide, first and second parts of the piezoelectric actuator, etc.) are not necessarily representative of reality.

DETAILED DESCRIPTION

Before starting a detailed review of embodiments of the invention, it is recalled that the invention according to its first aspect comprises in particular the optional features below which can be used in combination or alternatively:

According to one example, the phase modulator for a light beam comprises:
- a waveguide having a longitudinal axis directed in a first direction, the waveguide being intended to guide a light beam mainly along the longitudinal axis, and
- a piezoelectric actuator configured to apply a mechanical stress within said waveguide in response to an electrical bias, said actuator comprising a first part covering a first side of the waveguide, said first part having a first barycentre in a plane transverse to the longitudinal axis, said first barycentre being offset from the longitudinal axis of the waveguide by an offset distance d1 taken in a second direction in the plane transverse to the longitudinal axis, said actuator further comprising a second part covering a second side of the waveguide.

According to one example, the second part has a second barycentre in the plane transverse to the longitudinal axis.

According to one example, the second barycentre is offset from the longitudinal axis by an offset distance d2 taken in a third direction in the plane transverse to the longitudinal axis.

According to one example, the offset distance d1 is comprised between 15% and 50% of the main dimension L1. This allows increasing the first mechanical stress applied to the waveguide by the first part of the actuator, by a lever arm effect.

According to one example, the second axis of symmetry is offset from the longitudinal axis by an offset distance d2 taken in the third direction.

According to one example, the offset distance d2 is comprised between 15% and 50% of the main dimension L2. This allows increasing the second mechanical stress applied to the waveguide by the second part of the actuator, by a lever arm effect.

According to one example, the first and second parts of the actuator have respectively first and second faces facing the first and second sides of the waveguide, said first and second faces forming therebetween an angle comprised between 90° and 135°. An angle of 90° allows maximising the applied stress. An angle of 135° allows facilitating the manufacture the actuator parts, including the deposition of the different metal and piezoelectric layers forming the actuator parts. The angle formed between the first and second faces could thus be selected between 90° and 135° depending on the needs.

According to one example, the first and second parts of the actuator are secured to each other. This allows simultaneously biasing the two parts. The two actuator parts are thus simultaneously actuated.

According to one example, the actuator only comprises a first part and a second part.

According to one example, the first part and the at least one second part of the actuator are shaped such that the resultant of the stresses applied by the actuator on the waveguide, at the longitudinal axis thereof is not zero.

According to one example, the phase modulator is configured such that the actuator covers at least two sides of the waveguide. Furthermore, the actuator does not have a symmetry relative to an axis or a plane passing through the longitudinal axis XX of the waveguide. This allows increasing the stresses exerted by the actuator by a lever arm effect.

According to one example, the actuator is configured so as to cover only two sides of the waveguide.

According to one example, the second side of the waveguide is located substantially in line with an edge of the first part of the actuator. This allows maximising the lever arm effect exerted by the first part of the actuator.

According to one example, the waveguide comprises a core and a cladding surrounding the core.

According to one example, the first and second parts are in contact with the cladding. This allows directly transmitting the deformation of the first and second actuator parts to the cladding of the waveguide.

According to one example, the cladding has a thickness $e_{cladding}$, $e'_{cladding}$, $l_{cladding}$, taken in the transverse plane, which is greater than or equal to 1 µm. This allows limiting even eliminating the optical losses in the waveguide.

According to one example, the core has a lower face substantially at the same level as an edge of the second part of the actuator. This allows maximising the lever arm effect exerted by the second actuator part.

According to one example, the main dimension L1 is comprised between 5 µm and 60 µm, advantageously between 10 µm and 60 µm, even more advantageously between 20 µm and 60 µm.

According to one example, the main dimension L2 is comprised between 4 µm and 20 µm, advantageously between 5 µm and 10 µm.

According to one example, the ratio between the main dimension L1 and a width of the core $l_{core}$, taken in the second direction, is comprised between 8 and 100, advantageously between 15 and 100, even more advantageously between 30 and 100.

According to one example, the ratio between the main dimension L2 and a height of the core $e_{core}$, taken in the third direction, is comprised between 4 and 50, advantageously between 6 and 50, even more advantageously between 8 and 50.

According to one example, the main dimension L2 is strictly less than 0.5·L1.

According to one example, the main dimension L1 is strictly greater than 2·L2.

The invention according to its second aspect comprises in particular the optional features below which can be used in combination or alternatively:

According to one example, the first and second piezoelectric stacks are continuous with each other and each comprise a layer made of a piezoelectric material interposed between first and second metal layers.

According to one example, the method further comprises forming first and second electrical contacts respectively on the first and second metal layers.

Unless incompatibility, technical features described in detail for a given embodiment can be combined with the technical features described in the context of other embodiments described by way of example and without limitation, so as to form another embodiment which is not necessarily illustrated or described. Such an embodiment is obviously not excluded from the invention.

In the present invention, the phase modulator is advantageously intended for the production of light beam scanning devices. It can in particular be integrated in optical phase shifters of the Mach-Zehnder type or in optical phased arrays OPAs.

The invention can however be implemented more broadly for different optoelectronic devices. The invention can in particular be implemented in the context of optical switches and intensity modulators, for example in the field of telecommunications.

Unless explicitly stated, it is specified that, in the context of the present invention, the relative arrangement of a third layer interposed between a first layer and a second layer, does not necessarily mean that the layers are directly in contact with each other, but means that the third layer is either directly in contact with the first and second layers, or separated therefrom by at least one other layer or at least one other element.

The steps of the method as claimed are understood in the broad sense and can optionally be carried out in several sub-steps. A step can thus group together a series of sub-steps.

An element which "extends along a longitudinal axis" means an element which generally has an elongated shape.

In the present application, the first and second axes of symmetry can be generally understood as first and second sets of barycentres. This applies, for example, to the case where the first and second actuator parts do not rigorously have symmetries, in the mathematical meaning. This can in particular be the case when the dimensions of the different structures (actuator, waveguide) are not perfectly constant. These should be assessed within manufacturing tolerances. This can also be the case when the first and/or the second actuator part has a unilateral bevel. The axis of symmetry of the considered structure must in this case be appreciated as being the set of barycentres of said structure.

the terms "a substrate", "a layer", mean a device, "based on" a material M, a substrate, a layer, a device comprising this material M only or this material M and possibly other materials, for example alloying elements, impurities or doping elements.

A reference frame, preferably an orthogonormal reference frame, comprising the axes x, y, z directed in the first, second and third directions is represented in the appended figures.

In the present patent application, one will preferably talk about thickness for a layer and height for a structure or a device. The thickness is taken in a direction normal to the main extension plane of the layer, and the height is taken perpendicular to the basal plane xy of the substrate. Thus, a layer typically has a thickness along z, and a waveguide core has a height along z. The relative terms "on", "above", "under", "underlying" refer to positions taken in the direction z.

The dimensional values agreed within the manufacturing and measurement tolerances.

The terms "substantially", "about", "in the range of" mean, when they relate to a value, "within 10%" of this value or, when they relate to an angular orientation, "within 10°" of this orientation. Thus, a direction which is substantially normal to a plane means a direction having an angle of 90±10° relative to the plane.

In order to determine the structural and geometric features of a phase modulator, a scanning electron microscopy (SEM) or transmission electron microscopy (TEM) analysis can be performed.

In particular, a cross-sectional observation of the waveguide and the actuator can determine whether the actuator includes at least two parts disposed on two sides of the waveguide. Such an observation also allows determining the relative positions of the actuator parts relative to the waveguide, and in particular whether they are offset relative to the longitudinal axis of the waveguide.

The state of stress of the waveguide subjected to the action of the piezoelectric actuator can for example be evaluated through finite element simulation methods. Comsol, Coventor or ANSYS software, widely known in this field, can be used for these purposes.

A phase modulator comprising at least two piezoelectric actuator parts disposed around a waveguide so as to generate strong mechanical stresses in the waveguide can be an example of an index of the implementation of the present invention.

A general principle of the invention consists in exerting a stress within a waveguide in order to change its refractive index. A two-part piezoelectric actuator is used for this purpose. In the case where the waveguide extends along x, a first piezoelectric actuator part is formed above the waveguide so as to extend mainly along a plane xy. This first actuator part covers the waveguide and is advantageously offset along y relative to the waveguide. This first part allows generating a first mechanical stress in the waveguide. A second piezoelectric actuator part is formed on a sidewall of the waveguide so as to extend mainly in a plane xz. This second actuator part allows generating a second mechanical stress in the waveguide. The configuration of this two-part actuator, in particular the positioning and dimensioning of the first and second parts, allows accumulating the first and second mechanical stresses in order to amplify the state of stress within the waveguide.

In practice, a resulting stress is measured in the waveguide when the actuator is actuated. This resulting stress can be decomposed into first and second mechanical stresses, as exposed herein for the sake of clarity.

A first embodiment of a phase modulator according to the invention will now be described with reference to FIGS. 5A and 5B.

The phase modulator 100 comprises a piezoelectric actuator partially surrounding a waveguide 200.

The waveguide 200, 200' extends along a longitudinal axis XX directed along x.

This waveguide 200 is configured to guide the propagation of a light beam mainly along x. For this, the light beam is optically confined within the waveguide 200. This confinement can be carried out in a known manner by contrasting refractive indices. The waveguide 200 can thus comprise a core 210 coated in a cladding 220. The core 210 therefore has a refractive index $n_c$ greater than the refractive index $n_g$ of the cladding 220. According to one possibility, the core 210 of the waveguide 200 is based on silicon or silicon nitride SiN. The cladding 220 is based on silicon oxide $SiO_2$ or poly-silicon.

The core 210 of the waveguide 200 has a width $I_{core}$ along y typically comprised between 100 nm and 5 µm, for example 300 nm. It has a height $e_{core}$ along z typically between 100 nm and 3 µm, for example 300 nm.

Figure 5A:
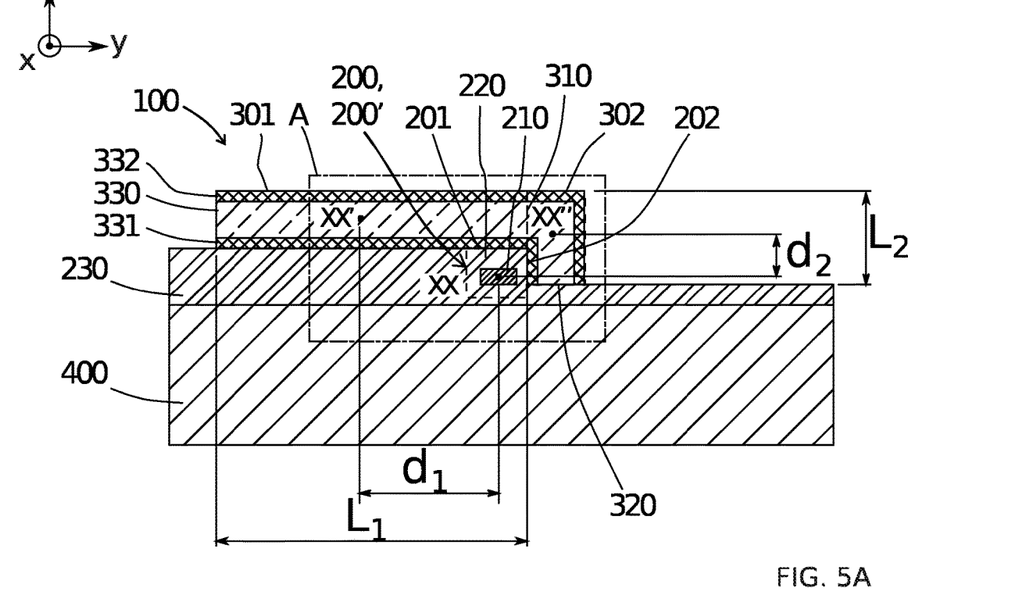
FIG. 5A illustrates a phase modulator, according to one embodiment of the present invention.
Figure 5B:
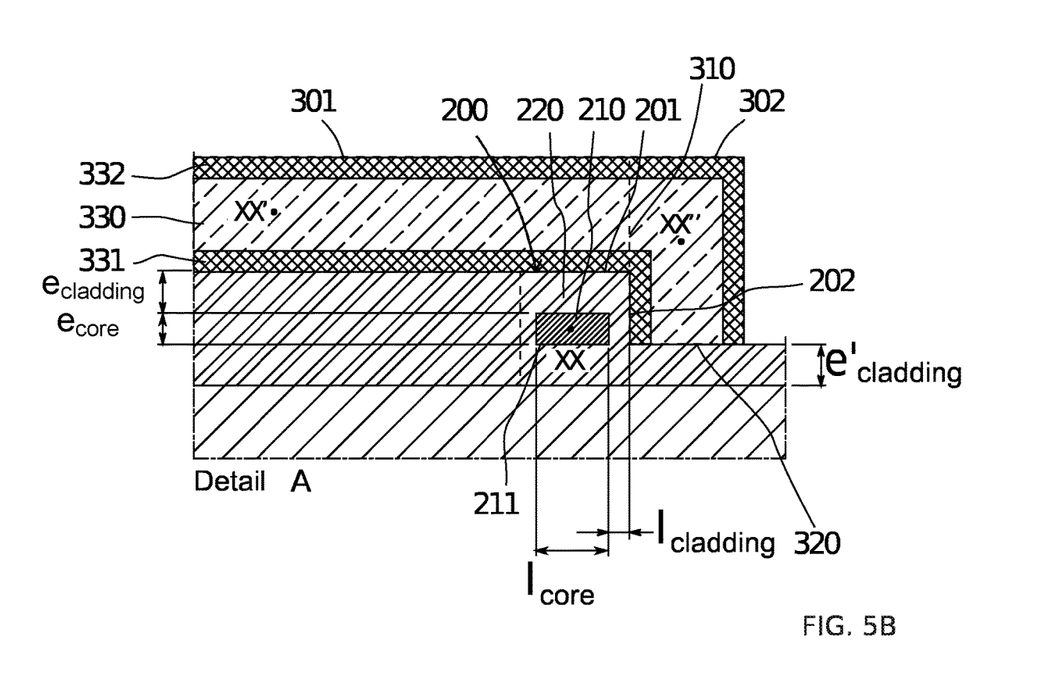
FIG. 5B is an enlarged view of the phase modulator illustrated in FIG. 5A.

The cladding 220 surrounds the core 210 and may have several portions of thicknesses $e_{cladding}$, $e'_{cladding}$, $I_{cladding}$ which are equal or different, as illustrated in FIG. 5B. These thicknesses $e_{cladding}$, $e'_{cladding}$, $I_{cladding}$ are preferably greater than or equal to 1 µm. This allows limiting the optical losses within the waveguide 200 during the propagation of the light beam.

The waveguide 200 is typically located within an encapsulation layer 230, for example of $SiO_2$, supported by a support 400 of silicon. Such a waveguide can advantageously be manufactured by technologies of the microelectronics industry, called silicon technologies.

The piezoelectric actuator is formed of two parts 301, 302 each extending on one side of the waveguide 200.

The two parts 301, 302 are preferably continuous with each other, as illustrated in FIGS. 5A, 5B. They comprise at least one layer 330 made of a piezoelectric material or of an ferroelectric material or of an electrostrictive material. This material can be based on Lead Zirconate Titanate (PZT), aluminum nitride, zinc oxide, polyvinylidene fluoride, lithium niobate $LiNbO_3$ (LNO), $BaTiO_3$, $PbTiO_3$. This layer 330 has a thickness comprised between 100 nm and a few micrometers, for example 2 µm. A greater thickness of layer 330 allows obtaining a greater deformation of the material when it is subjected to an electrical voltage. The stress induced in the waveguide is therefore increased. The two parts 301, 302 can typically comprise electrodes 331, 332 intended to apply a potential difference in the layer 330.

The first part 301 extends along a plane xy and covers one side 201 of the waveguide 200. It has a dimension L1 along y comprised between 5 µm and 60 µm, preferably greater than or equal to 10 µm and even more preferably greater than or equal to 20 µm, for example in the range of 30 µm. This first part 301 typically has an axis of symmetry XX' directed along x. This axis of symmetry XX' is offset relative to the longitudinal axis XX by a distance taken along y. Preferably, this distance d1 is comprised between 15% and 50% of the dimension L1. According to a preferred possibility, the edge 310 of this first actuator part 301 is located in line with the side 202 of the waveguide 200. The edge 310 and the side 202 are therefore located substantially in the extension of the each other. The waveguide 200 is thus positioned under one end of the first actuator part 301. This maximises the force applied to the waveguide by this first actuator part 301, when the piezoelectric actuator is subjected to an electrical voltage.

The second part 302 extends along a plane xz and at least partially covers a side 202 of the waveguide 200. It has a dimension L2 along z preferably comprised between 4 µm and 10 µm. This second part 302 typically has an axis of symmetry XX" directed along x. This axis of symmetry XX" is offset relative to the longitudinal axis XX by a distance d2 taken along z. Preferably, this distance d2 is comprised between 15% and 50% of the dimension L2. According to a preferred possibility, the edge 320 of this second actuator part 302 is located substantially at the same level along z as the lower face 211 of the core 210. This maximizes the force applied to the waveguide by this second actuator part 302, when the piezoelectric actuator is subjected to an electrical voltage.

According to one possibility which is not illustrated, the second part 302 is not strictly vertical or perpendicular to the first part 301. The side 202 can thus have an angle comprised between 45° and 90° relative to the base plane xy. An angle of about 70° can thus allow a better adhesion of the part 302 on the side 202 of the waveguide 200. Such an angle can also allow obtaining a better continuity between the parts 301 and 302. The side 202 is not necessarily planar. It can have a curved or irregular topology.

Such an actuator configuration 300 allows concentrating the mechanical stresses at the waveguide 200. The addition of a second actuator part 302 allows almost doubling the intensity of the stresses applied to the waveguide. Finite-element simulations have been performed with the commercial software COMSOL for an actuator comprising only a first part 301 and for an actuator comprising two parts 301, 302 as described and illustrated in the present application. The results of these simulations show that, when a potential difference of 30 V is applied to the piezoelectric actuator, the Von Mises stresses in the waveguide are in the range of $1.81 \cdot 10^8$ $N/m^2$ for the actuator comprising only the first part 301, while these constraints are in the range of $3.25 \cdot 10^8$ $N/m^2$ for the actuator comprising the two parts 301, 302.

For a given level of stress, such an increase in the effectiveness of the two-part actuator allows, for example, decreasing the dimension L1 relative to a single-part actuator. This allows reducing the space requirement of the actuator. The integration of such an actuator in an optical phased array OPA is thus facilitated. The increased effectiveness of the two-part actuator also allows reducing the actuation voltages required to achieve the target stress level. This allows decreasing the power consumption of the phase modulator comprising such a two-part actuator. The performance of the phase modulator is thus improved.

Such a phase modulator can advantageously be integrated into different optical systems, such as phase shifters or optical phased arrays OPA.

Figure 6:
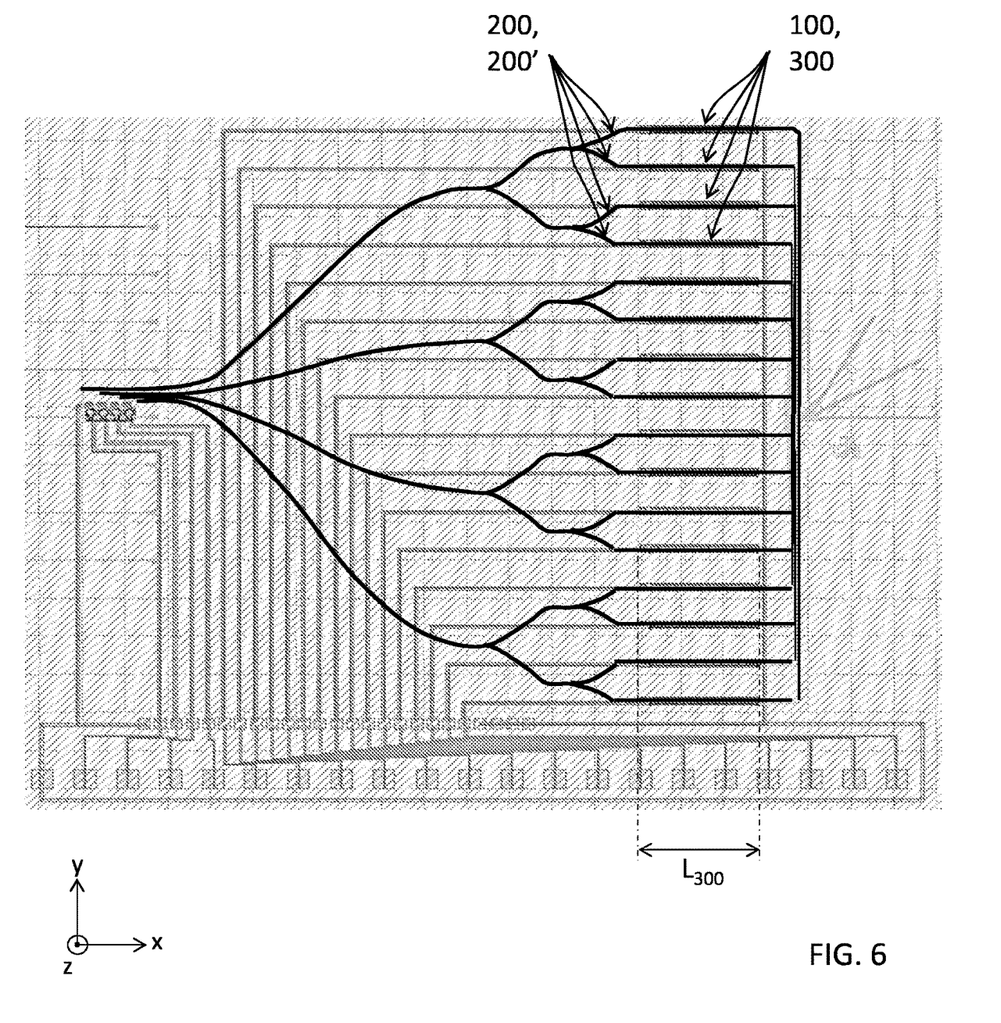
FIG. 6 illustrates an optical phased array comprising phase modulators according to one embodiment of the present invention.

FIG. 6 illustrates an example of an optical phased array OPA. This array typically comprises a plurality of phase modulators 100 on different branches of waveguide 200. These modulators 100 comprise actuators 300 having lengths L300 along x which may be equal to each other, as illustrated in FIG. 6. Alternatively, the lengths L300 can be different from each other.

The manufacture of the phase modulator 100 can be executed by micro-manufacturing techniques known to the person skilled in the art.

FIGS. 7A to 7E show different steps of a method for manufacturing the phase modulator 100 according to the present invention.

Figure 7A:
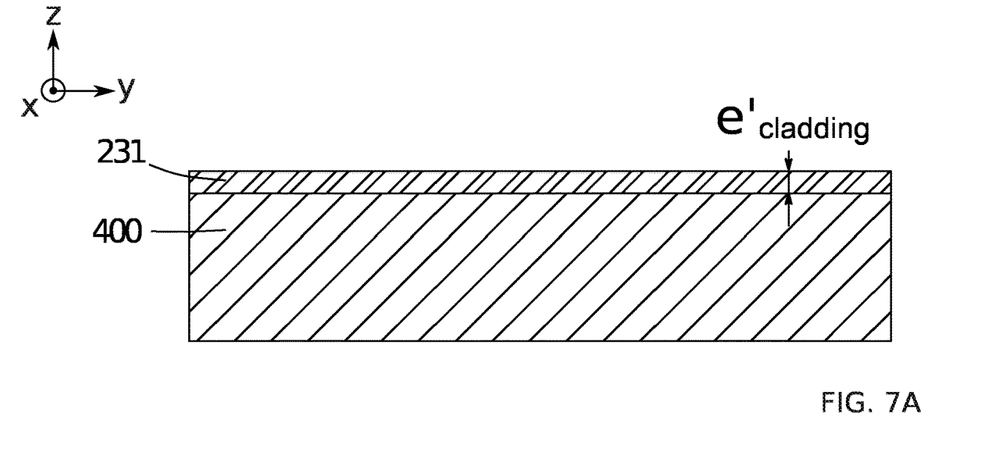
FIGS. 7A to 7E illustrate steps of a method for manufacturing a phase modulator according to an embodiment of the present invention.

A first step illustrated in FIG. 7A consists in forming a layer 231 with a thickness $e_{cladding}$ of about 2 µm on a substrate 400. This layer 231 is intended to partially form the cladding 220 of the waveguide 200. It is preferably based on $SiO_2$. It may result in a known manner from a thermal oxidation or from conformal deposition, for example by chemical vapor deposition (CVD).

Figure 7B:
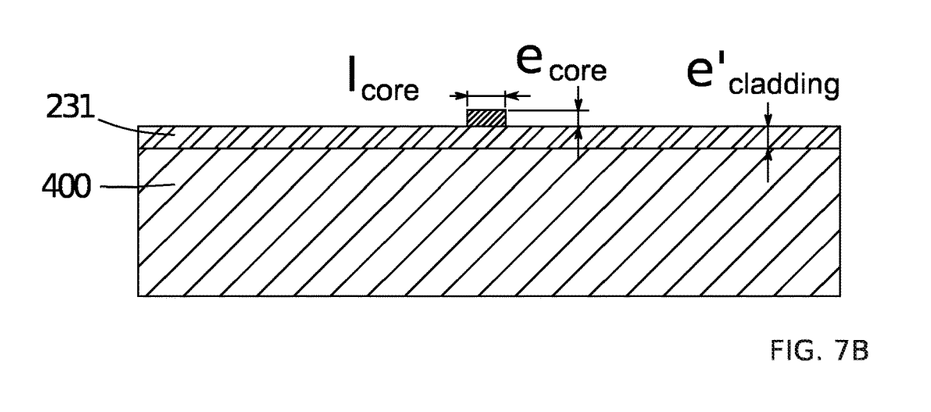

The next step illustrated in FIG. 7B consists in forming a core 210 of a waveguide 200 on the layer 231. The core 210, for example based on SiN, is typically formed by depositing an SiN layer with a thickness $e_{core}$ of about 300 nm followed by a lithography and an etching which are configured to retain the core pattern 210 of a width $l_{core}$.

Figure 7C:
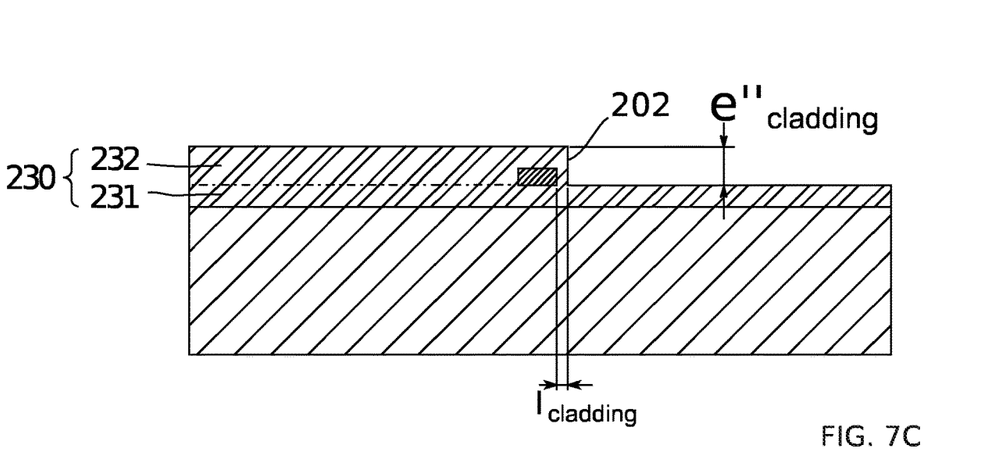

The next step illustrated in FIG. 7C consists in encapsulating the core 210 by a layer 232. The layer 232 is preferably based on the same material as the layer 231. The layers 231, 232 thus form an encapsulation layer 230 in which the core 210 is located. The layer 232 has a thickness $e''_{cladding}$ of about 1.3 µm, so that the layer portion 232 located above the core 210 has a thickness of about 1 µm. A chemical mechanical polishing step can be performed so as to planarise this layer 232. The layer 232 is structured by lithography/etching so as to form the side 202 of the waveguide. This structuring is configured to maintain a layer thickness 232 $I_{cladding}$ of about 1 µm between the side 202 and the core 210.

Figure 7D:
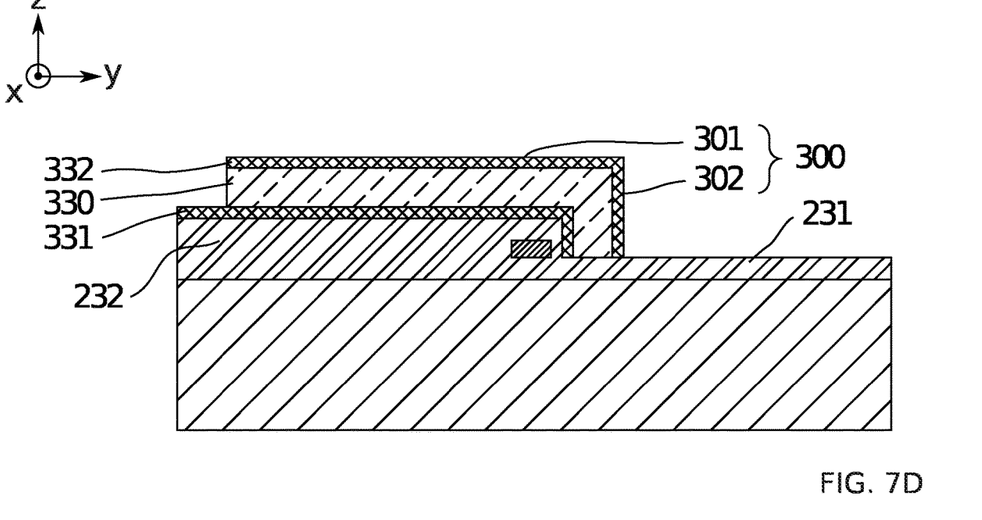

The next step illustrated in FIG. 7D consists in forming the first and second parts 301, 302 of an actuator 300. For this purpose, a deposition of a metal layer 331, for example made of platinum with a thickness of about 100 nm is performed on the layer 232 and on the side 202. Optionally, the formation of a 20 nm thick titanium dioxide layer interposed between the layer 331 and the layer 232 can be performed. A layer 330 made of a piezoelectric material is then formed on the metal layer 331, preferably in a manner consistent with an approximately constant thickness. A metal layer 332, for example made of ruthenium, approximately 100 nm thick, is then deposited on the layer 330. The metal layers 331, 332 form two electrodes between which the piezoelectric layer 330 is interposed. The stack of the layers 331, 330, 332 on the upper face of the layer 232 forms the first part 301 of the actuator 300. The stack of the layers 331, 330, 332 on the side of the layer 232 forms the second part 302 of the actuator 300. The layers 331, 330, 332 are preferably continuous between the first and second parts 301, 302 of the actuator 300. The layers 331, 330, 332 of the second part 302 can bear on the layer 231. The layers 330, 332 of the first part 301 are preferably structured by lithography/etching so as to expose an underlying layer portion 331, as illustrated in FIG. 7D. This exposed portion subsequently allows forming an electrical contact on the electrode 331.

Figure 7E:
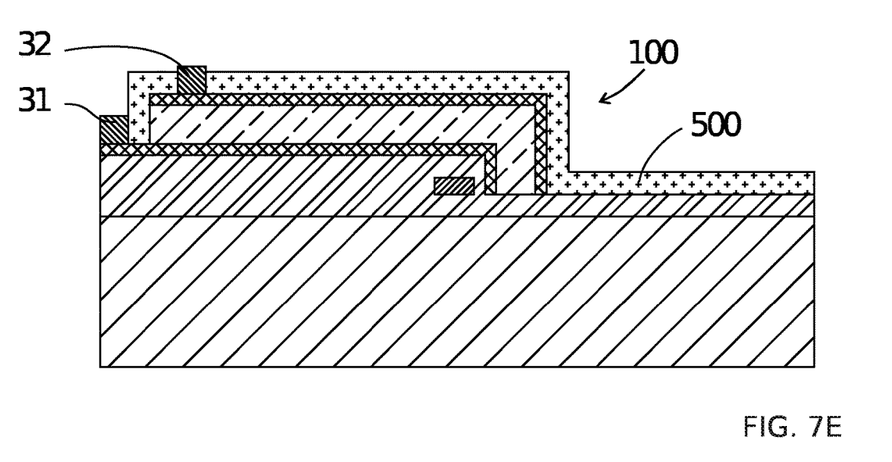

The next step illustrated in FIG. 7E consists in passivating the actuator to form electrical contacts 31, 32 on the electrodes 331, 332. The passivation can be performed by depositing a passivation layer 500, for example based on $SiO_2$ or SiN, on the first and second parts 301, 302. This passivation layer 500 can have a thickness comprised between 100 nm and 5 μm, for example 300 nm.

The contacts 31, 32 are respectively formed on the electrodes 331, 332. An opening of the passivation layer 500 can be previously performed to expose electrode portions 331, 332. In a known manner, the contacts can be based on gold or titanium/gold. They can be carried out by a standard technique called lift-off. They can have a thickness of about 500 nm.

The phase modulator 100 thus made allows obtaining amplified refractive index variations within the waveguide, thanks to the greatest mechanical stresses exerted in said waveguide by the piezoelectric actuator 300 in two parts 301, 302.

The invention is not limited to the previously described embodiments and extends to all embodiments covered by the claims.

The actuator can for example comprise at least one third part at least partially covering a third side of the waveguide and having a dimension L3 different from L1 and L2.

The invention claimed is:

1. A phase modulator for a light beam, comprising:
a waveguide having a longitudinal axis directed in a first direction, the waveguide being configured to guide a light beam mainly along the longitudinal axis, and
a piezoelectric actuator configured to apply at least one mechanical stress within said waveguide in response to an electrical bias, said actuator comprising a first part covering a first side of the waveguide, said first part having a first axis of symmetry essentially parallel to the longitudinal axis and a main dimension L1 taken in a second direction of a plane transverse to the longitudinal axis, said first axis of symmetry being offset from the longitudinal axis by an offset distance taken in the second direction,
wherein the actuator comprises a second part at least partially covering a second side of the waveguide, said second part having a second axis of symmetry essentially parallel to the longitudinal axis and a main dimension L2 taken in a third direction of the plane transverse to the longitudinal axis.

2. The modulator according to claim 1, wherein the first part and the at least one second part of the actuator are shaped so that a sum of stresses applied by the actuator, at the longitudinal axis of the waveguide is non-zero.

3. The modulator according to claim 1, wherein the actuator does not have a symmetry relative to an axis or a plane passing through the longitudinal axis of the waveguide.

4. The modulator according to claim 1, wherein the offset distance is between 15% and 50% of the main dimension L1.

5. The modulator according to claim 1, wherein the second axis of symmetry is offset from the longitudinal axis by an offset distance taken in the third direction.

6. The modulator according to claim 5, wherein the offset distance is between 15% and 50% of the main dimension L2.

7. The modulator according to claim 1, wherein the first and second parts of the actuator respectively have first and second faces facing the first and second sides of the waveguide, said first and second faces forming therebetween an angle comprised between 90° and 135°.

8. The modulator according to claim 1, wherein the first and second parts of the actuator are secured to each other.

9. The modulator according to claim 1, wherein the actuator comprises only a first part and a second part.

10. The modulator according to claim 1, wherein the second side of the waveguide is located substantially in line with an edge of the first part of the actuator.

11. The modulator according to claim 1, wherein the waveguide comprises a core and a cladding surrounding the core, and wherein the first and second parts are in contact with the cladding.

12. The modulator according to claim 11, wherein the cladding has a thickness, taken in the transverse plane, which is greater than or equal to 1 μm.

13. The modulator according to claim 11, wherein the core has a lower face substantially at the same level as an edge of the second part of the actuator.

14. The modulator according to claim 1, wherein the main dimension L2 is strictly less than 0.5 times L1.

15. A method for making a phase modulator according to claim 1, the method comprising:
forming a layer of a cladding material with a thickness on a silicon substrate,
forming a waveguide pattern of a core material, said pattern having the longitudinal axis directed in the first direction,
coating the pattern by a coating based on the cladding material, so as to form the waveguide comprising a core and a cladding,
structuring the coating so as to form at least one first side and one second side of the waveguide, and
depositing first and second piezoelectric stacks respectively on the first and second sides of the waveguide, so as to form first and second parts of the actuator.

16. The method according to claim 15, further comprising:
structuring the first stack such that the first part of the actuator has the first axis of symmetry essentially parallel to the longitudinal axis and offset from the longitudinal axis by the offset distance taken in the second direction of the plane transverse to the longitudinal axis.

17. The method according to claim 15, wherein the first and second piezoelectric stacks are continuous with each other and each comprise a layer made of a piezoelectric material interposed between first and second metal layers, said method further comprising forming first and second electrical contacts respectively on the first and second metal layers.

18. A system, comprising at least one phase modulator according to claim 1, the system being one of a telecommunications system, an imaging and remote sensing system, a LIDAR system, an optical phased array, and an optical switch.

* * * * *